United States Patent
Ransom (10) Patent No.: US 12,263,874 B1
(45) Date of Patent: Apr. 1, 2025

(54) MOTORIZED GAME CART

(71) Applicant: Daniel Ransom, Sioux City, IA (US)

(72) Inventor: Daniel Ransom, Sioux City, IA (US)

( * ) Notice: Subject to any disclaimer, the term of this patent is extended or adjusted under 35 U.S.C. 154(b) by 0 days.

(21) Appl. No.: 18/591,888

(22) Filed: Feb. 29, 2024

Related U.S. Application Data (60) Provisional application No. 63/622,655, filed on Jan. 19, 2024.

(51) Int. Cl.
| | | |
|---|---|---|
| B62B 1/26 | (2006.01) | |
| B62B 1/14 | (2006.01) | |
| B62B 5/00 | (2006.01) | |
| B62B 5/06 | (2006.01) | |

(52) U.S. Cl.
CPC .............. *B62B 1/26* (2013.01); *B62B 1/14* (2013.01); *B62B 5/0036* (2013.01); *B62B 5/0053* (2013.01); *B62B 5/0066* (2013.01); *B62B 5/0069* (2013.01); *B62B 5/067* (2013.01); *B62B 2202/42* (2013.01); *B62B 2203/00* (2013.01); *B62B 2501/06* (2013.01)

(58) Field of Classification Search
CPC .. B62B 1/26; B62B 1/14; B62B 5/067; B62B 2202/42; B62B 2203/00; B62B 5/0036; B62B 5/0053
See application file for complete search history.

(56) References Cited

U.S. PATENT DOCUMENTS

| | | | | |
|---|---|---|---|---|
| 8,757,639 B2 * | 6/2014 | Graffis | ...................... | B62B 1/12 |
| | | | | 280/30 |
| 9,415,789 B2 * | 8/2016 | Sommers | ................ | B62B 1/042 |
| 2004/0130112 A1 * | 7/2004 | Doyle | ..................... | B62B 5/068 |
| | | | | 280/47.26 |
| 2007/0194542 A1 * | 8/2007 | Dixon | ................. | A01M 31/006 |
| | | | | 280/47.24 |
| 2008/0197608 A1 * | 8/2008 | Dixon | .................... | A22B 7/006 |
| | | | | 280/654 |
| 2021/0284221 A1 * | 9/2021 | Perez | .................... | B62B 5/0046 |

FOREIGN PATENT DOCUMENTS

DE  202009010767 U1 *  1/2011  ............... B62B 3/04

OTHER PUBLICATIONS

ELK-A-HAUL, "Game Cart", elkahaul.com/game-cart/, accessed Apr. 25, 2024, pp. 2.

* cited by examiner

*Primary Examiner* — Faye M Fleming
(74) *Attorney, Agent, or Firm* — Fredrikson & Byron, P.A.

(57) ABSTRACT

A motorized cart for transporting game animals includes a cart body. The cart body has a support assembly generally horizontal to support a game animal and a handle assembly extending upwardly at an angle from the support assembly. The motorized cart includes a restraining system to securely hold the game animal to the support assembly. The motorized cart further includes wheels disposed on the cart body and supporting the cart body above the ground, a motor connected to at least one of the wheels, and a battery connected to the motor to supply electrical energy to the motor. The motorized cart further includes a control switch attached to the handle assembly and electrically connected to the battery and the motor to control the flow of electrical energy from the battery to the motor.

17 Claims, 8 Drawing Sheets

MOTORIZED GAME CART

CROSS-REFERENCE TO RELATED APPLICATION

This application claims priority to U.S. Provisional Application Ser. No. 63/622,655, filed Jan. 19, 2024, entitled "MOTORIZED GAME CART," the disclosure of which is hereby incorporated by reference in its entirety.

FIELD

The various embodiments herein relate to carts configured to hold and/or transport game animals in areas where driving vehicles is not practicable such as woods, forest, large uneven fields, and/or other areas.

BACKGROUND

Various game animals can often be heavy. For example, deer can weigh, on average, 150 pounds to 200 pounds, while elk can weigh anywhere from 500 pounds to 700 pounds, depending on age and gender. Often, animals are hunted far from roads or vehicles yet require transportation from the location at which they are hunted to a secondary location for further transport or processing. Due to their size and weight, transportation can be difficult and can require additional equipment.

There are various means to transport game animals, such as carts. However, these carts often require that a user push the cart (and its contents, often hundreds of pounds) across rough or difficult terrain, sometimes in inclement weather. This transportation can require significant exertion from a user, which can be dangerous when a user is using the cart in a remote or isolated location.

BRIEF DESCRIPTION OF THE DRAWINGS

The following drawings are illustrative of particular examples of the present invention and therefore do not limit the scope of invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The various embodiments herein relate to carts configured to hold and/or transport game animals. In particular, the various embodiments herein are directed to motorized carts.

Figure 1:
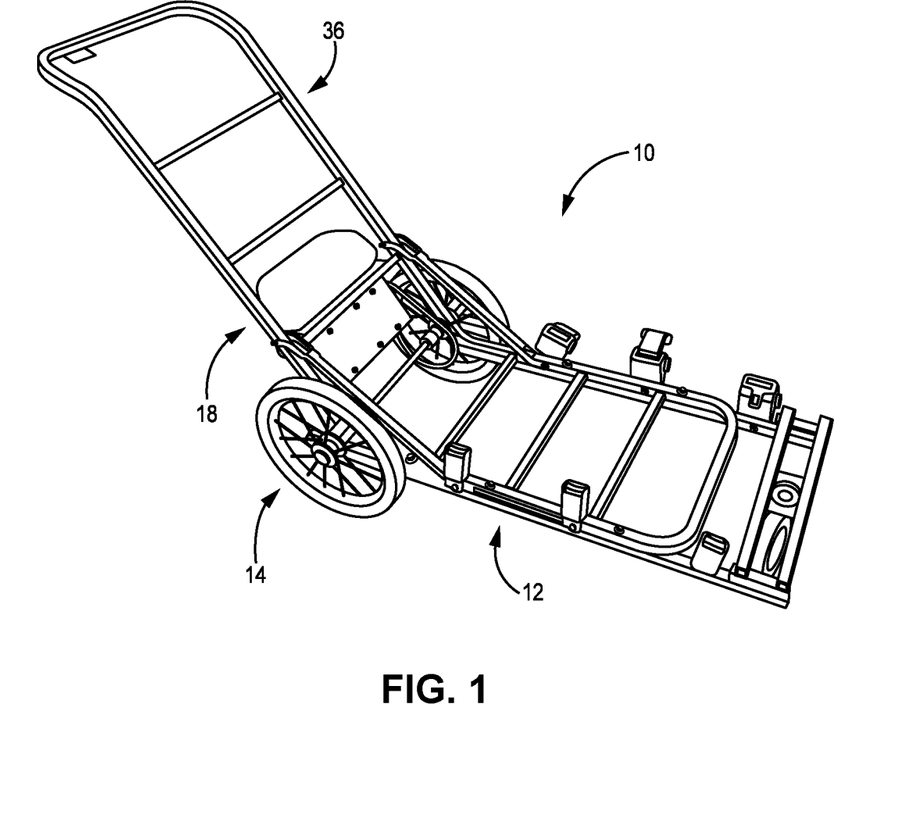
FIG. 1 is a perspective view of a motorized game cart, in accordance with one or more examples of this disclosure.

FIG. 1 shows a motorized game cart of an embodiment of the disclosure herein. In an embodiment, the cart includes a cart body 12, a wheel system 14, a propulsion system 16, and a control system 18. The embodiment shown is one example embodiment, but it should be known that the cart may take any suitable size, shape, and configuration to accomplish the stated improvements.

The cart body 12 may be any suitable size and shape and may be disposed generally horizontally to allow a user to place the item to be transported (e.g., game such as deer or elk, or any other item that may be too heavy to carry long distances and/or across uneven terrain, or dense wooded areas a traditional vehicle cannot operate within) and held in place to transport to a desired destination or to another vehicle for further transportation. The cart body 12 may be supported above the ground and allowed to move by the wheel system 14.

The cart body 12 may include a handle assembly 36. The handle assembly 36 may be any size, shape and configuration and may extend generally upwardly in an embodiment such that a user may control the motorized game cart at an easily accessible height and width. The handle assembly 36 may be tilted backwards at an angle (e.g., either slightly or up to or over 45 degrees) such that the user may rotate the motorized cart backward (toward the user) to lift the front wheel up to overcome uneven terrain or the like.

In some embodiments, the wheel system 14 includes two larger rear wheels and one smaller front wheel, but it should be known that any configuration and size of wheels such as four larger wheels, four smaller wheels, two larger wheels in front and a smaller wheel in the back, a configuration include six or more wheels, or any other configuration may be appropriate for a desired usage.

In some embodiments, the propulsion system 16 may include an electric motor operably coupled to the wheel system 14 to apply rotational force to at least one wheel of the wheel system 14 to propel the motorized cart in a desired direction. The propulsion system may be operably coupled to the control assembly for independent power and user control of the motor.

Cart Body

Figure 2A:
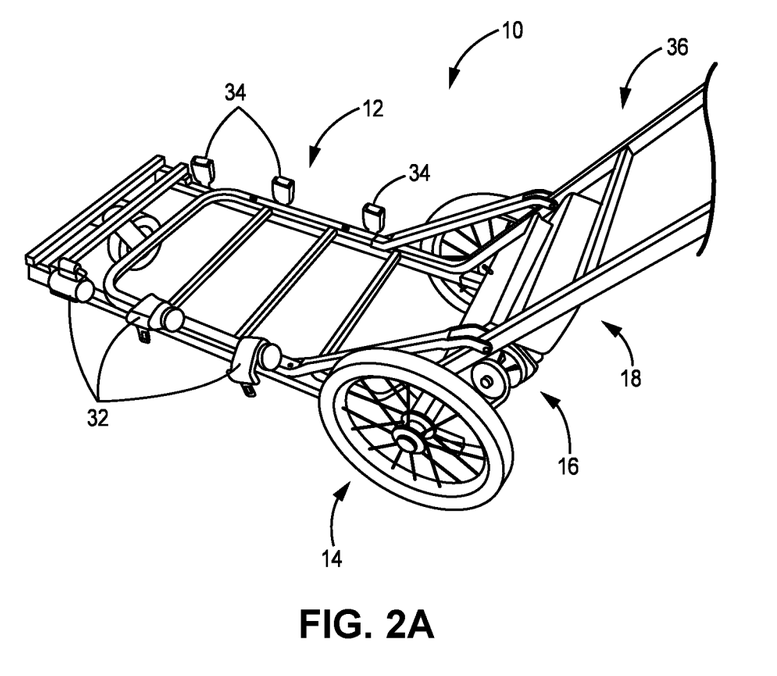
FIG. 2A is a perspective view of a motorized game cart, in accordance with one or more examples of this disclosure.
Figure 2B:
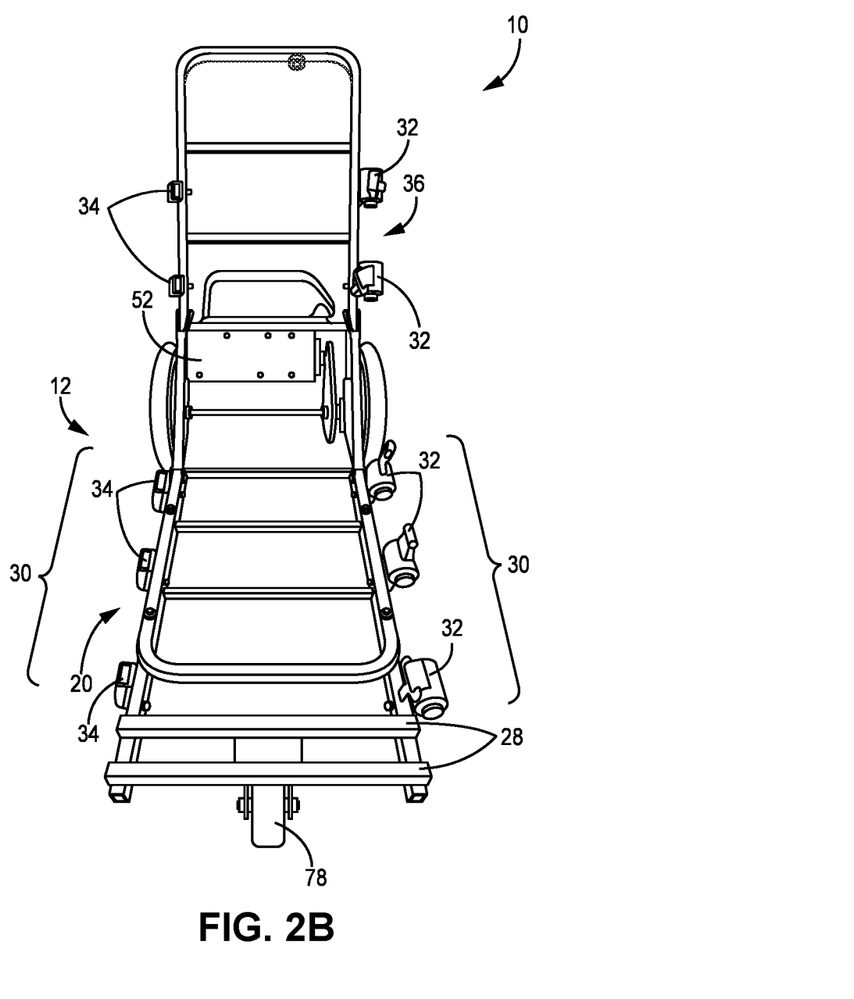
FIG. 2B is a front perspective view of a motorized game cart, in accordance with one or more examples of this disclosure.

As shown in FIGS. 2A-2B, the cart body 12 can include a variety of features. In some embodiments, the cart body 12 can be configured to hold and/or support game animals during transportation. In such an embodiment, the cart body 12 may be any suitable size, shape, and configuration to support the weight of larger game (e.g., deer, elk, bear, or the like). The cart body 12 may be made of, as one example, a number of generally square steel tubes with a cross-sectional length and width of about 1-inch that are connected into a shape (e.g., a substantially rectangular shape that is substantially parallel to the ground such that game remains on the cart body 12 during transportation) that is in a generally horizontal orientation to support the weight of and hold the game and allow its transportation. In other embodiments, the cart body 12 can be a general utility cart and can be configured to transport various cargo disposable onto the cart body 12. In such embodiments, the steel tubes may be coupled by e.g., welding or any other connection known in the art. In still other embodiments, the cart may comprise a single tube that is bent into a suitable configuration, may be any other shape (e.g., a circle, oval, triangle, or any other regular or irregular shape), or any other support element known in the art that is large enough and strong enough to support the game carcass.

In some embodiments, the cart body 12 includes a restraining system 30. The restraining system may be any size, shape and configuration suitable to secure the item to be transported (e.g., the game carcass or the like) to the cart body 12. In some embodiments, the restraining system 30 may include one or more restraints 32 (e.g., spring loaded straps) disposed on one side of the cart body 12. The restraining system may further include restraint receivers 34 on an opposite side of the cart body 12.

In the exemplary embodiment of FIGS. 2A-2B, the cart 10 includes three sets of restraints 32 and restraint receivers 34 on the lower portion of the cart body 12, and two sets of restraints 32 and restraint receivers 34 on the handle assembly 36. In other embodiments, there may be fewer or more sets of restraints on the lower portion of the cart body 12 and/or fewer (in some embodiments omitting the sets of restraints and receivers altogether) on the handle assembly 36. In some embodiments, the elements of the restraining system 30 can be, one or more automobile-type seatbelt or any other type of fastener including an adjustable strap or flexible strap such as a bungy or the like. However, these restraints are exemplary only and any fastener may be used to secure or fasten cargo to the cart body 12.

Handle Assembly

The motorized cart 10 (for simplification called a "cart 10" throughout the disclosure) may include a handle assembly 36 coupled to the cart body 12. In some embodiments, the handle assembly 36 is angularly connected to the cart body 12 and can include a handle assembly 36. The connection between the handle assembly and the cart body 12 may be a rigid connection such that movement of the handle assembly 36 (e.g., rotation of the handle assembly or lateral forward or backward movement) results in a corresponding movement of the cart body 12.

The handle assembly 36 may be any size, shape, and configuration to allow a user to manipulate (e.g., laterally move or rotate) the motorized cart in any way the user desires. In some embodiments, as shown in FIG. 1A, as a non-limiting example handle assembly 36 can be a frame comprised of 1"×1" square steel tube stock. In still other embodiments, the handle assembly may be comprised of angle iron, or combinations thereof.

In some embodiments, the frame can be generally rectangular and extend upwardly at an angle other than perpendicular to the cart body 12. In some embodiments, the handle assembly 36 includes right upright arm 38, left upright arm 40, crossbars 42, handle assembly hinges 44, handle pockets 46, upper brace pins 48, handle support braces (right and left) 50, and/or control attachment braces 52. It should be known that in other embodiments, more or fewer elements may be included in the handle assembly 36 without deviating from the scope of the disclosure.

In the embodiment shown, each of the right and left upright arms 38, 40 extend upwardly from the support assembly 20 at an angle (e.g., at 60 degrees to the support assembly 20, 45 degrees to the support assembly, or any other angle the user deems desirable). Each of the right and left upright arms 38, 40 may have a bend near or proximal the top of the upright arms 38, 40 (e.g., a bend toward the rear of the cart 10), which may make the cart easier to push, control, and/or rotate backward to lift the front wheel 28 off the ground.

In some embodiments, a number of crossbars 42 may be attached between the right and left upright arms 38, 40 to increase the stability of the handle assembly 36. In some embodiments, handle support braces 50 are attached between the support assembly 20 and the handle assembly 36 to aid the stability of the cart 10. In some embodiments, the handle support braces are hingedly attached at a bottom portion to the right or left longitudinal arm 22, 24, and removably attached at a top portion to the corresponding right or left upright arm 38, 40 (e.g., by using removable upper brace pins 48 or the like). Additionally, in some embodiments, the handle assembly 36 includes control attachment braces 52 for convenient attachment of control and propulsion elements.

Figure 3A:
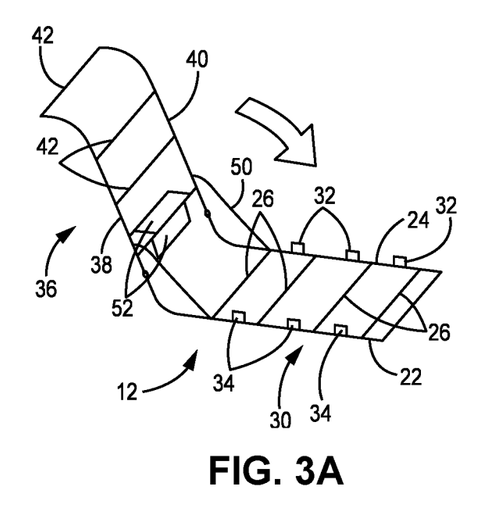
FIG. 3A is perspective schematic view of a motorized game cart in an unfolded position, in accordance with one or more examples of the disclosure.
Figure 3B:
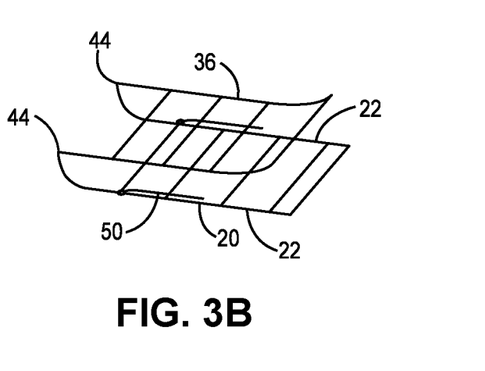
FIG. 3B is perspective schematic view of a motorized game cart in a folded position, in accordance with one or more examples of the disclosure.

In the embodiment shown in FIGS. 3A-3D, the cart body 12 may be foldable from a usage position as shown in FIG. 3A to a transport position as shown in FIG. 3B to be more portable. In the embodiment shown, each of the left and right upright arms 38, 40 may include a hinge 44 about which the left and right upright arms 38, 40 fold upon themselves. When a user desired to transport the cart 10, the upper brace pins 48 are removed from the right and left upright arms 38, 40, and the handle support braces are rotated down onto the support assembly 20.

Figure 3C:
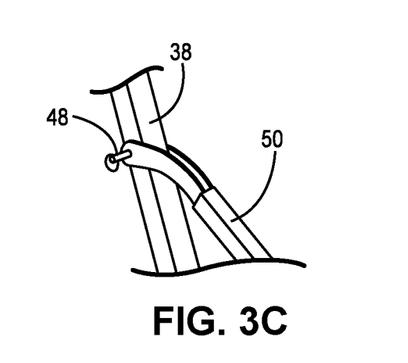
FIG. 3C is a close-up view of a hinge of a handle assembly of a motorized game cart, in accordance with one or more examples of the disclosure.
Figure 3D:
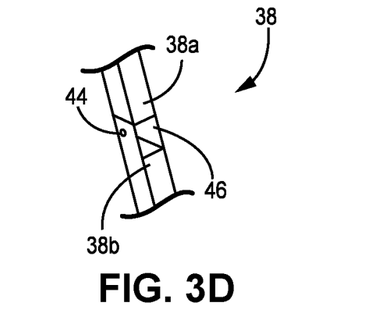
FIG. 3D is another close-up view of a hinge of a handle assembly of a motorized game cart with the supporting braces removed, in accordance with one or more examples of the disclosure.

To fold the cart 10, the following description shown in FIGS. 3C and 3D details the right upright arm, but it should be known that similar structure is on the left upright arm 40. In some embodiments, the right upright arm 38 includes an upper portion 38a and a lower portion 38b, with a handle pocket 46 between the two. The upper portion 38a may rotate downwardly about the hinge 44 and at least a portion of the upper portion 38a rotates into the handle pocket 46 when in the transport configuration.

Wheel System

Figure 4:
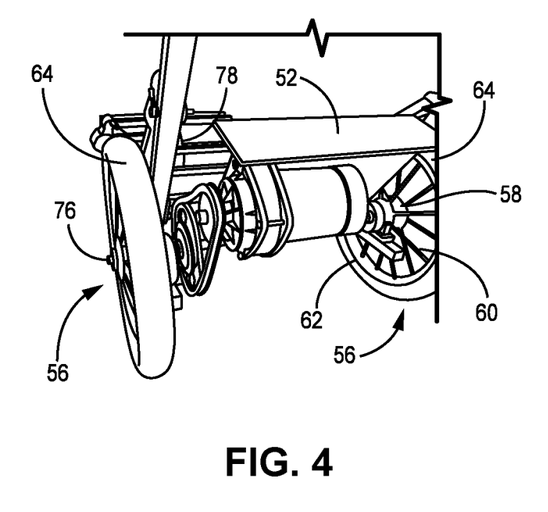
FIG. 4 is a close-up rear view of a propulsion system of a motorized game cart, in accordance with one or more examples of this disclosure.
Figure 5:
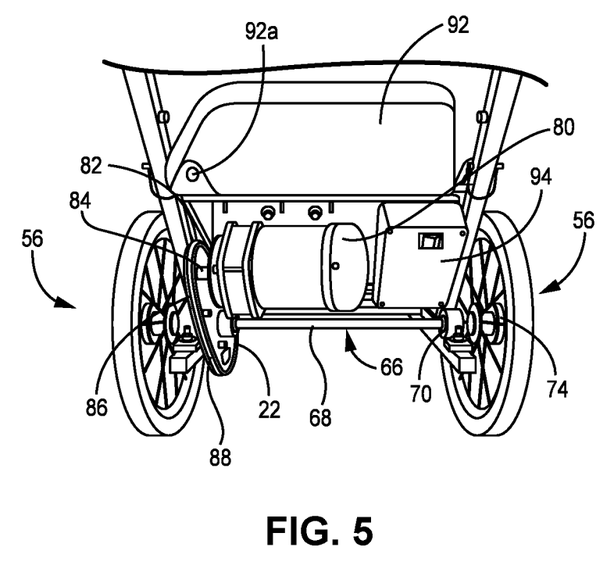
FIG. 5 is a close-up rear view of a propulsion system and control system of a motorized game cart, in accordance with one or more examples of this disclosure.

Turning to FIGS. 4-5, the cart body 12 can be supported by at least one wheel 56. Some embodiments of the cart 10 can include two rear wheels 56 and a front wheel 78 disposed on the bottom side of the cart body 12. In some embodiments, the rear wheels 56 are positioned approximately where the handle assembly 36 transitions to the support assembly 20 of the cart body 12. The front wheel 78, in some embodiments, may be a swivel caster or other free-wheeling wheel (e.g., the front wheel may be free to turn in any way or may be locked in the straight forward direction). When the cart 10 is in use, the front wheel 78 may be used to directionally position and/or maneuver the cart 10. In other embodiments, the front wheel may be operably coupled to the motor 80 (discussed in detail, below) for powered propulsion. In still other embodiments, more or fewer wheels may be used in the front, the rear, or any other position to provide the support for the cart body 12 and the propulsion for the cart 10.

The wheels 56 may be any size and configuration suitable to provide the support for the cart body 12 and the propulsion for the cart 10. The wheels in the embodiment of FIG. 4 include a bearing 58, a plurality of spokes 60, a rim 62, and a tire 64, although some of the elements may be eliminated or other elements added without deviating from the scope of the disclosure. The tire 64 may be any material suitable for the traversing the uneven terrain and supporting the heavy loads required. In some embodiments, to keep the size of the tires 64 as small as possible, a solid tire (i.e., solid rubber with no internal air component) may be used. In this way, if the temperature varies wildly the internal pressure needed for the use cases described herein is maintained without the large fluctuation of an air-filled tire.

The rear wheels 56 of the cart 10 can be operably connected to the cart body 12 through an axle 66. In the embodiment shown, a single axle 66 reaches across the width of the cart body 12 and reaches both rear wheel 56, although it should be known that single axles for each wheel may be used, and one, both, or all may be connected for powered movement. The axle 66 can be disposed within a portion of the cart body 12 configured for the passage of the axle 66 therethrough. The wheels 56 can be mounted onto the axle 66, about the wheel bearings 58 thereby affixing the wheels 56 to the cart body 12. In the embodiment shown, the wheel bearings are solid bearings affixed to the axle 66 such that rotation of the axle rotates the wheels 56.

Propulsion System 16

In some embodiments such as shown in FIG. 5, the propulsion system 16 may be any size, shape, and configuration suitable to provide the power necessary for the powered movement of the cart 10. In some embodiments, the propulsion system 16 includes frame bearings 70, a sprocket flange 72, outer hubs 74, hub nuts 76, motor 80, drive axle 82, drive sprocket 84, chain 86, and axle sprocket 88, although in other embodiments, more or fewer elements may be used to effectuate the transfer of power from a motor to the wheel(s) 56.

The propulsion system 16 may include a motor 80 operably coupled to the wheel system 14. The motor may be any size and configuration suitable to apply enough motive force to move the cart 10 across uneven terrain when fully loaded with a large game carcass. In some embodiments, the motor is a 12V-36V motor, most preferably a 36V, 1.3 N-m motor with a 6-1 reduced gear ratio to carry a 200 lb. carcass up a 5% grade. The motor transfers the power to the wheel(s) 56 first to a drive sprocket 84 which is coupled to an axle sprocket 88 attached to the axle 66 via a sprocket flange 72 through a chain or belt 86. In some embodiments, the drive sprocket is about half the size of the axle sprocket, providing another 2-1 reduced gear ratio to the wheels, although it should be known that the gear ratios may be any ratio necessary to carry out the desired output.

The motor 80 can be mounted to the cart body 12 in a variety of ways. For example, in some embodiments, the cart body 12 can include control attachment bracket(s) 52. The control attachment bracket(s) 52 can be configured to have the motor 80 attached thereto. In some embodiments, the motor 80 can be fastened to the control attachment bracket(s) 52 using a plurality of mechanical fasteners. In some embodiments, the mechanical fasteners can be screws or bolts.

In some embodiments, the frame bearings 70 are one-way bearings, in that they allow rotation in one direction, but not the opposite direction. In such embodiments, the frame bearings 70 allow the axle 66 to rotate forward, allowing the user to propel the cart 10 forward, but not backward. This allows a user to prevent the cart 10 from undesired backward rolling when e.g. going uphill and the motor loses power because of a motor failure, a batter failure, or the like.

Control System 18

Figure 6:
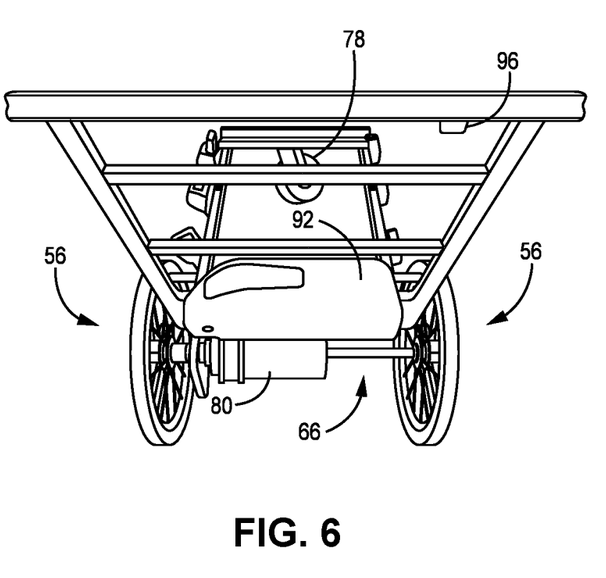
FIG. 6 is an upper rear perspective view of a motorized game cart, in accordance with one or more examples of this disclosure.

As shown in FIG. 6, a user can control the motor 80 using a control system 18. The control system may be any size, shape, or configuration suitable to provide the motor 80 with the desired electrical signals to move the cart 10 in the way the user desires. In the embodiment shown in FIG. 6, the control system includes a rechargeable battery 92, a power switch 94, and a control switch 96, although it should be known that elements may be added or removed to achieve the desired output without deviating from the scope of the disclosure.

In some embodiments, the battery 92 is a rechargeable battery. The rechargeable battery may be any size and configuration suitable to provide the on-board power necessary to carry out the desired movement of the cart. In the embodiment shown, the battery 92 is a 36V Li-ion battery with 10-50 Amp-hrs. Such a battery should easily last a season such that the batter need not be recharged in-season, providing desirable reliability. The battery may include a power switch 94 which, when in the off position, cuts off all power supplied to the motor regardless of the control switch 96 position.

The battery 92 can be mounted to the cart body 12 in a variety of ways. For example, in some embodiments, the cart body 12 can include control attachment bracket(s) 52. The control attachment bracket(s) 52 can be configured to have the battery 92 attached thereto. In some embodiments, the battery 92 can be fastened to the control attachment bracket(s) 52 using a plurality of mechanical fasteners. In some embodiments, the mechanical fasteners can be screws or bolts.

In some embodiments, the control switch 96 is a thumb switch attached to the top crossbar 42 for easy reach for a user when holding the crossbar 42. The thumb switch 96 may be a variable resistor operably connected to the battery and the motor such that the harder the switch is pushed, the more power is supplied to the motor from the battery, and the faster the cart 10 is powered. In some embodiments, the thumb switch 96 is connected to the motor 80 and/or the battery 92 via a wired connection (not shown).

Operating the motor 80 can reduce the amount of force needed by a user to push the cart 10. Without the motor 80, a user must apply a force to the cart 10 to move the cart 10 and its contents. Incorporation of a motor 80 causing rotational movement of the wheel(s) 56 can reduce the amount of force needed to be exerted by a user, thereby facilitating movement of the cart 10 and making the movement of the cart 10 more efficient.

Motorized Cart Usage

In some embodiments, a user may have a need to move a game carcass from the place where the animal is killed to the processing station (e.g., a specific processing station, the user's home, and/or a processing station near the user's home) or the user's vehicle for further transportation. In such an embodiment, the user transports the motorized cart to the place the game carcass falls, either before or after field dressing the game carcass. The user then places the carcass on the cart body 12 of the motorized cart 10. In some embodiments, the user optionally uses one or more of the restraints 32 to secure the game carcass to the cart body 12. The user then may depress the thumb switch 96 to energize the motor 80. In some embodiments, the motor 80 then rotates the drive sprocket 84, driving the chain 86, driving the axle sprocket 88, driving the axle 66, and providing the driving force to at least one of the wheels 56.

When the motorized cart 10 reaches its destination, the user may then release the game carcass from the restraining system 30 and move it, as non-limiting examples, onto the user's vehicle or the processing station.

With variations of the described embodiments it has been shown that the motorized cart 10 can reach speeds of 10 miles per hour or greater on level fields with a game carcass and the user riding on the support assembly as well.

While the various systems described above are separate implementations, any of the individual components, mechanisms, or devices, and related features and functionality, within the various system embodiments described in detail above can be incorporated into any of the other system embodiments herein.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, there is certain inadvertent error and variation in the real world that is likely through differences in the manufacture, source, or precision of the components used to make the various components or carry out the methods and the like. The term "about" also encompasses these variations. The term "about" can include any variation of 5% or 10%, or any amount-including any integer-between 0% and 10%. Further, whether or not modified by the term "about," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range. Although the various embodiments have been described with reference to preferred implementations, persons skilled in the art will recognize that changes may be made in form and detail without departing from the spirit and scope thereof.

Although the various embodiments have been described with reference to preferred implementations, persons skilled in the art will recognize that changes may be made in form and detail without departing from the spirit and scope thereof.

What is claimed is:

1. A motorized cart for transporting game animals, comprising:
    a cart body comprising:
        a support assembly disposed generally horizontally and configured to support a game animal;
        a handle assembly extending upwardly at an angle from the support assembly and foldable onto the support assembly the handle assembly further comprising a hinge; and
        a restraining system configured to securely hold the game animal to the support assembly;
    a plurality of wheels disposed on the cart body and supporting the cart body above the ground;
    motor operatively coupled to at least one of the plurality of wheels;
    a battery operatively coupled to the motor and configured to supply electrical energy to the motor; and
    a control switch attached to the handle assembly and electrically connected to the battery and the motor, the control switch operable to control the flow of electrical energy from the battery to the motor.

2. The motorized cart of claim 1, wherein the control switch is a variable resistor thumb switch.

3. The motorized cart of claim 2, wherein the thumb switch is operable to propel the cart at any speed between 0 and 10 miles per hour.

4. The motorized cart of claim 2, wherein the thumb switch is operable to propel the cart at any speed between 0 and 15 miles per hour.

5. The motorized cart of claim 1, wherein the cart body further comprises at least one handle support brace extending from a rear portion of the support assembly to a lower portion of the handle assembly.

6. The motorized cart of claim 5, wherein the at least one handle support brace is removably attached to one of the handle assembly and the support assembly.

7. The motorized cart of claim 6, wherein the at least one handle support brace is removably attached via a brace pin that a user can pull out to allow the handle assembly to fold down upon the support assembly.

8. The motorized cart of claim 1, wherein:
    the support assembly comprises a series of steel tubes formed substantially parallel to the ground; and
    the handle assembly comprises a series of steel tubes formed substantially at an angle to the support assembly, wherein the angle is between 45 and 60 degrees.

9. The motorized cart of claim 1, wherein a ratio of a rotational velocity of one of the plurality of wheels to a rotational velocity of the motor is 6 to 1 or greater.

10. The motorized cart of claim 1, wherein at least one wheel of the plurality of wheels is coupled to a one-way bearing disposed on the cart body configured to allow rotational movement of the at least one wheel in a forward direction and prevent rotational movement of the at least one wheel in a reverse direction.

11. The motorized cart of claim 1, wherein the restraining system comprises at least one spring loaded strap on a first side of the support assembly, and at least one corresponding restraint receiver on a second side of the support assembly.

12. The motorized cart of claim 11, wherein the restraining system further comprises at least one spring loaded strap on a first side of the handle assembly, and at least one corresponding restraint receiver on a second side of the handle assembly.

13. A motorized cart for transporting large items in areas not conducive for road vehicle movement, the motorized cart comprising:
    a cart having a support assembly disposed generally horizontally and a handle assembly extending generally upwardly from the support assembly:
    a restraining system configured to securely hold a game animal to the cart, the restraining system comprising a spring loaded strap extending from a first side of the support assembly to a restraint receiver disposed on the second side of the support assembly;
    a wheel system disposed on and reaching downwardly below a bottom of the cart and configured to support the weight of the cart on the ground, the wheel system comprising a plurality of wheels;
    motor operatively coupled to the wheel system;
    a battery operatively coupled to the motor and configured to supply electrical energy to the motor;

a control switch attached to the handle assembly and electrically connected to the battery and the motor, the control switch operable to control the flow of electrical energy from the battery to the motor.

14. The motorized cart of claim 13, wherein at least one wheel of the plurality of wheels is coupled to a one-way bearing disposed on the cart configured to allow rotational movement of the at least one wheel in a forward direction and prevent rotational movement of the at least one wheel in a reverse direction.

15. The motorized cart of claim 13, wherein:
the handle assembly further comprises a hinge;
the cart further comprises at least one handle support brace extending from a rear portion of the support assembly to a lower portion of the handle assembly; and
the at least one handle support brace is removably attached to one of the handle assembly and the support assembly via a brace pin that a user can pull out to allow the handle assembly to fold down upon the support assembly.

16. A foldable motorized cart comprising:
a cart comprising:
    a support assembly disposed generally horizontally;
    a handle assembly extending generally upwardly from the support assembly and having a hinge; and
    at least one handle support brace extending from a rear portion of the support assembly to a lower portion of the handle assembly;
a wheel system disposed on and reaching downwardly below a bottom of the cart and configured to support the weight of the cart on the ground, the wheel system comprising a plurality of wheels;
motor operatively coupled to the wheel system;
a battery operatively coupled to the motor and configured to supply electrical energy to the motor; and
a control switch attached to the handle assembly and electrically connected to the battery and the motor, the control switch operable to control the flow of electrical energy from the battery to the motor,
wherein the at least one handle support brace is removably attached to one of the handle assembly and the support assembly via a brace pin that a user can pull out to allow the handle assembly to fold down upon the support assembly.

17. The foldable motorized cart of claim 16, wherein at least one wheel of the plurality of wheels is coupled to a one-way bearing disposed on the cart configured to allow rotational movement of the at least one wheel in a forward direction and prevent rotational movement of the at least one wheel in a reverse direction.

* * * * *